United States Patent
Prociw et al.

(10) Patent No.: US 11,248,528 B2
(45) Date of Patent: Feb. 15, 2022

(54) INTERNAL FUEL MANIFOLDS

(71) Applicant: Delavan Inc., West Des Moines, IA (US)

(72) Inventors: Lev A. Prociw, Johnston, IA (US); Jason Ryon, Carlisle, IA (US); Gregory A. Zink, Des Moines, IA (US)

(73) Assignee: Delavan Inc., West Des Moines, IA (US)

( * ) Notice: Subject to any disclaimer, the term of this patent is extended or adjusted under 35 U.S.C. 154(b) by 110 days.

(21) Appl. No.: 16/656,752

(22) Filed: Oct. 18, 2019

(65) Prior Publication Data
US 2021/0115855 A1    Apr. 22, 2021

(51) Int. Cl.
| F02C 7/00 | (2006.01) |
| F02C 7/22 | (2006.01) |
| F23R 3/02 | (2006.01) |
| F23R 3/28 | (2006.01) |

(52) U.S. Cl.
CPC ............... *F02C 7/222* (2013.01); *F23R 3/02* (2013.01); *F23R 3/28* (2013.01); *F05D 2220/32* (2013.01); *F05D 2240/35* (2013.01)

(58) Field of Classification Search
CPC .... F23R 3/02; F23R 3/28; F23R 3/283; F23R 3/34; F02C 7/222; F02C 7/24; F05D 2240/35; F05D 2240/32
See application file for complete search history.

(56) References Cited

U.S. PATENT DOCUMENTS

| 3,151,453 | A | * | 10/1964 | Lefebvre | F23R 3/20 60/765 |
| 5,099,644 | A | * | 3/1992 | Sabla | F23R 3/34 60/207 |
| 5,231,833 | A | * | 8/1993 | MacLean | F02C 7/222 60/734 |
| 5,613,363 | A | * | 3/1997 | Joshi | F23D 11/107 60/737 |

(Continued)

FOREIGN PATENT DOCUMENTS

| EP | 1113159 A2 | 7/2001 |
| EP | 1741983 A2 | 1/2007 |

(Continued)

OTHER PUBLICATIONS

Extended European Search Report dated Sep. 7, 2020, issued during the prosecution of European Patent Application No. 19216269.1.

*Primary Examiner* — Edwin Kang
(74) *Attorney, Agent, or Firm* — Locke Lord LLP; Joshua L. Jones; Scott D. Wofsy

(57) ABSTRACT

A system includes an internal manifold ring defining at least one circumferentially extending flow channel. A plurality of feed arms extends outward from the manifold ring. A circumferentially segmented outer ring can be supported from the feed arms, outboard of the feed arms. Each feed arm can include a plurality of branches extending therefrom, wherein each branch is in fluid communication with the manifold ring through a respective one of the feed arms. A plurality of nozzles can be included, each nozzle connected to a respective one of the branches, wherein the system is devoid of nozzles radially inward from the manifold ring.

13 Claims, 6 Drawing Sheets

(56) References Cited

U.S. PATENT DOCUMENTS

| | | | | |
|---|---|---|---|---|
| 5,771,696 | A * | 6/1998 | Hansel | F23D 23/00 |
| | | | | 60/739 |
| 2004/0103663 | A1* | 6/2004 | Haynes | F23R 3/346 |
| | | | | 60/737 |
| 2008/0072599 | A1 | 3/2008 | Morenko et al. | |
| 2012/0122043 | A1 | 5/2012 | Siewert et al. | |
| 2014/0075949 | A1* | 3/2014 | Prociw | F02C 7/222 |
| | | | | 60/740 |
| 2014/0338357 | A1* | 11/2014 | Lovett | F02K 3/10 |
| | | | | 60/776 |
| 2016/0376997 | A1 | 12/2016 | Prociw | |
| 2017/0074518 | A1* | 3/2017 | Lee | F23R 3/14 |
| 2018/0283692 | A1* | 10/2018 | Ryon | F23R 3/283 |

FOREIGN PATENT DOCUMENTS

| | | |
|---|---|---|
| EP | 3553293 A1 | 10/2019 |
| EP | 3553383 A1 | 10/2019 |

\* cited by examiner

INTERNAL FUEL MANIFOLDS

BACKGROUND

1. Field

The present disclosure relates to manifolds, and more particularly to fuel manifolds such as in gas turbine engines.

2. Description of Related Art

Gas turbine fuel manifolds have conventionally been located on the outside of the combustion case at the largest diameter of the engine surrounding the combustor.

The conventional techniques have been considered satisfactory for their intended purpose. However, there is an ever present need for improved systems and methods for manifolding, e.g. for fuel manifolds in gas turbine engines. This disclosure provides a solution for this need.

SUMMARY

A system includes an internal manifold ring defining at least one circumferentially extending flow channel. A plurality of feed arms extend outward from the manifold ring. A circumferentially segmented outer ring can be supported from the feed arms, outboard of the feed arms. Each feed arm can include a plurality of branches extending therefrom, wherein each branch is in fluid communication with the manifold ring through a respective one of the feed arms. A plurality of nozzles can be included, each nozzle connected to a respective one of the branches, wherein the system is devoid of nozzles radially inward from the manifold ring. The manifold ring can define a plurality of independent flow channels extending circumferentially therein. The feed arms can each define a plurality of independent flow channels therethrough, for individual staging of multipoint injection.

A main inlet can be included, extending radially inward to the manifold ring. The main inlet can extend along one of the feed arms. The main inlet can extend along an upstream side of one of the feed arms, e.g., wherein the branches described above extend to downstream facing nozzles. The main inlet can branch from the one of the feed arms in a y-junction proximate to the manifold ring. The main inlet can include a plurality of independent flow channels. The main inlet can extend inward from a position outward of an outer ring, e.g. the segmented outer ring as described above. An outer high pressure engine case can be included radially outside the outer ring, wherein the main inlet extends inward through the outer high pressure engine case. The high pressure engine case can be devoid of any additional inlets extending therethrough to the manifold ring. An inner high pressure engine case can be included radially inside the manifold ring. A combustor can be included wherein the manifold ring and feed arms are integrated in a combustor dome at an upstream end of the combustor.

A heat shield can extend about and shielding the one circumferentially extending flow channel. The system can be free of elastomeric seals. A method includes supplying fuel to a ring manifold of a gas turbine engine radially inward of all nozzles of the gas turbine engine.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
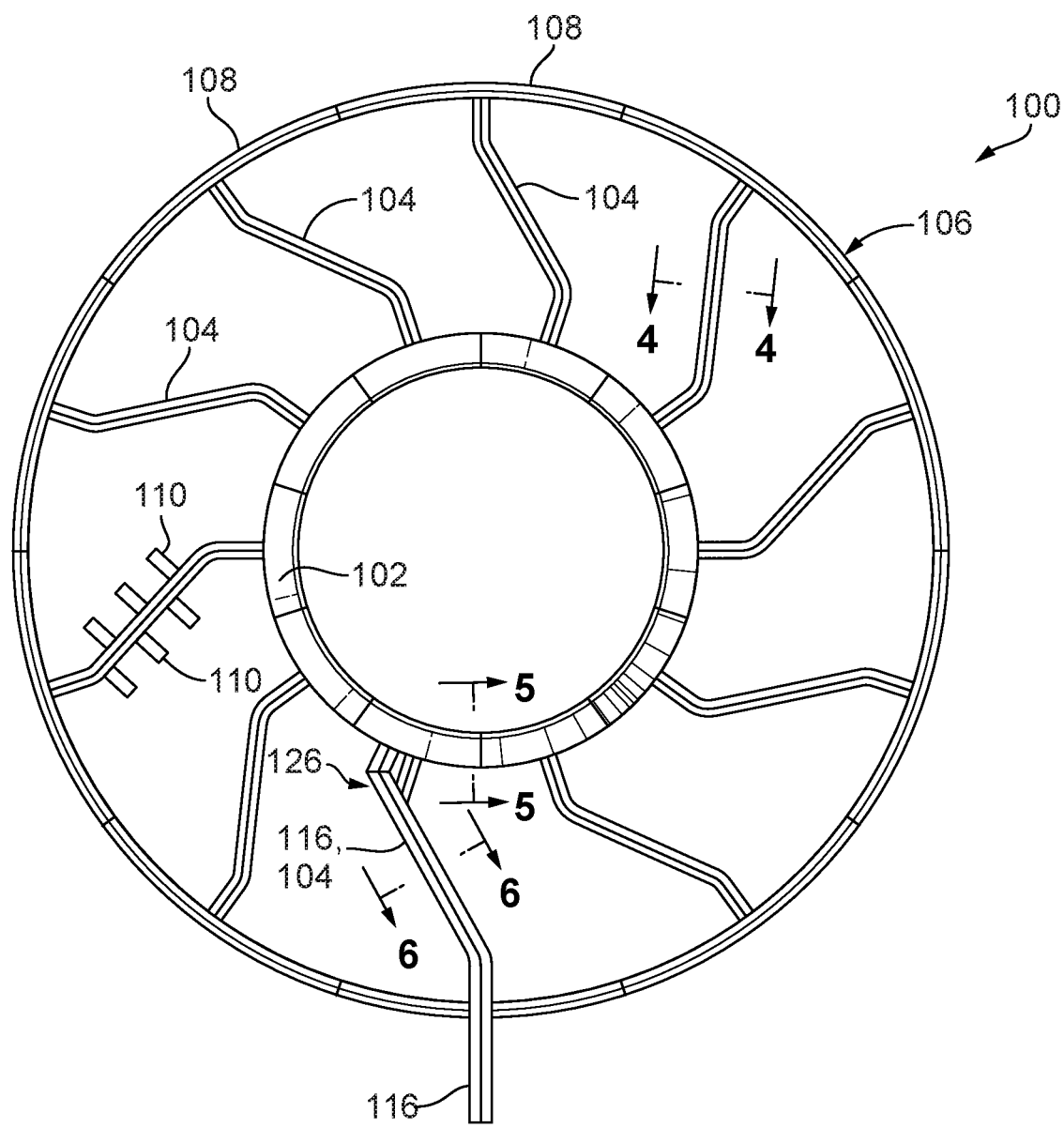
FIG. 1 is an axial elevation view of an embodiment of a system constructed in accordance with the present disclosure, showing the inner manifold ring, the feed arms, and the outer ring.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-8, as will be described. The systems and methods described herein can be used to for fuel injection in gas turbine engines.

The system 100 includes an internal, inner manifold ring 102. A plurality of feed arms 104 extend outward from the manifold ring. An outer ring 106 is supported from the feed arms 104 and is radially outboard of the feed arms 104. The outer ring 106 can be circumferentially segmented, e.g., with one segment 108 suspended from each of the respective feed arms 104. Each feed arm can include a plurality of branches 110 extending therefrom, wherein each branch 110 is in fluid communication with the manifold ring 102 through the respective feed arms 104 from which the branch 110 extends. The branches 110 are omitted from the drawings for the most part for sake of clarity, however a few are shown in FIG. 1, and in FIG. 3 one is shown schematically.

Figure 2:
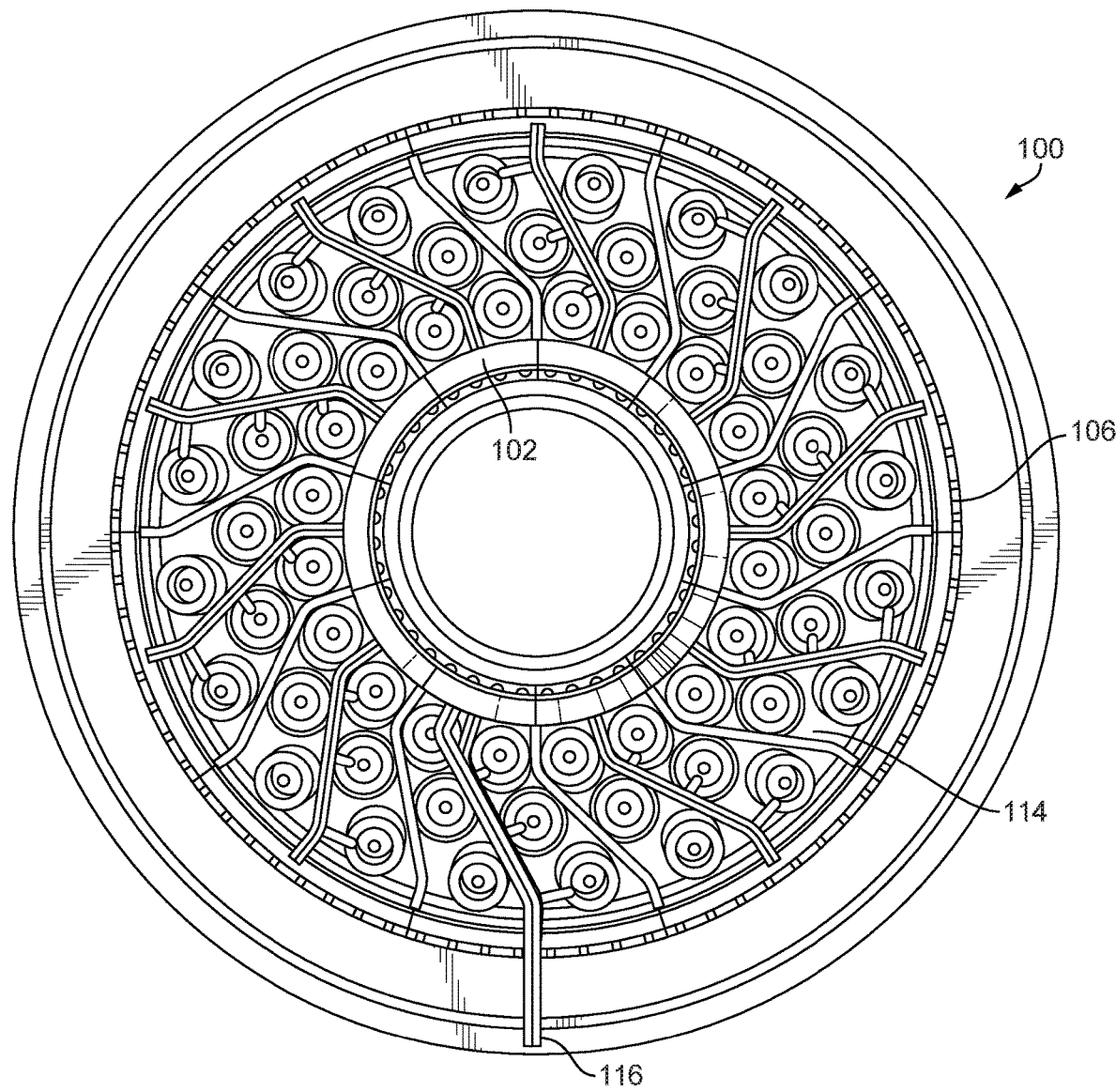
FIG. 2 is an axial elevation view of the system of FIG. 1, showing the nozzles and combustor dome wall.
Figure 3:
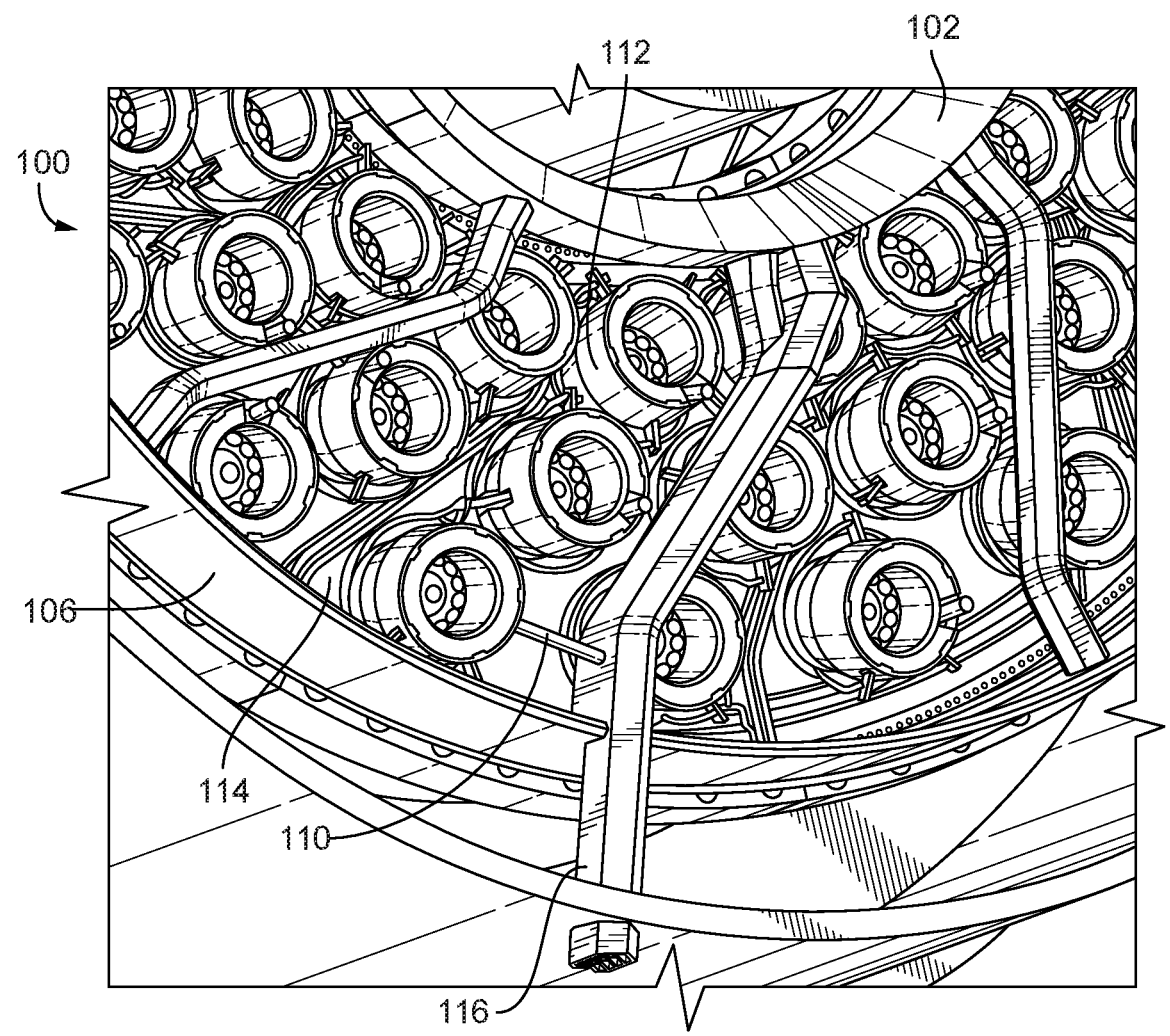
FIG. 3 is a perspective view of a portion of the system of FIG. 1, schematically indicating one of the branches connecting between one of the feed arms and one of the nozzles.

With reference now to FIG. 2, a plurality of nozzles 112 are included, each nozzle 112 connected to a respective one of the branches 110 for issuing a spray of fluid such as fuel from the manifold ring 102. The system 100 is devoid of nozzles 112 radially inward from the manifold ring 102. As shown in FIG. 3, a combustor dome wall 114 is included, sealing between the manifold ring 102 and the outer ring 106, as well as sealing between the nozzles 112 to force air flow through the nozzles 112, e.g. wherein the air flow is from a compressor upstream of the system 100, flowing to a turbine downstream of the system 100.

Figure 4:
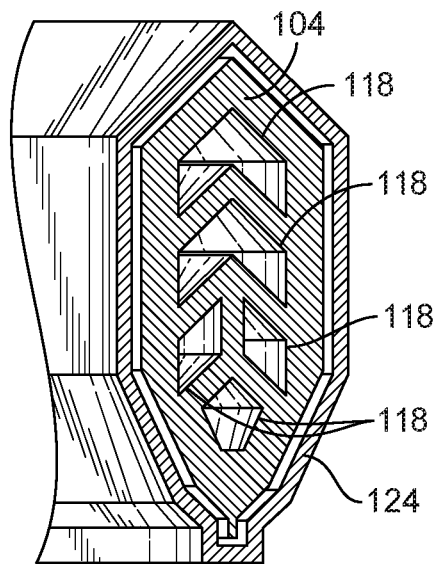
FIG. 4 is a cross-sectional view of a portion of the system of FIG. 1, showing the multiple flow channels through one of the feed arms.
Figure 5:
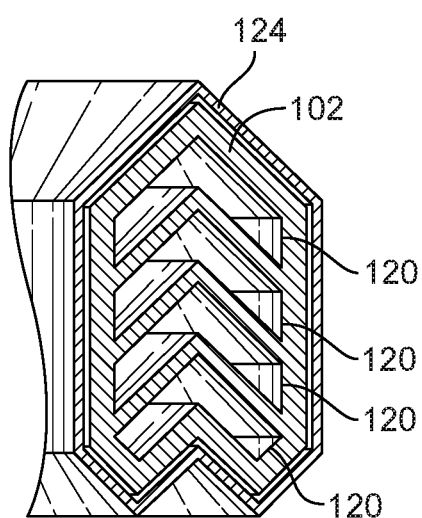
FIG. 5 is a cross-sectional view of a portion of the system of FIG. 1, showing the multiple flow channels in the manifold ring.
Figure 6:
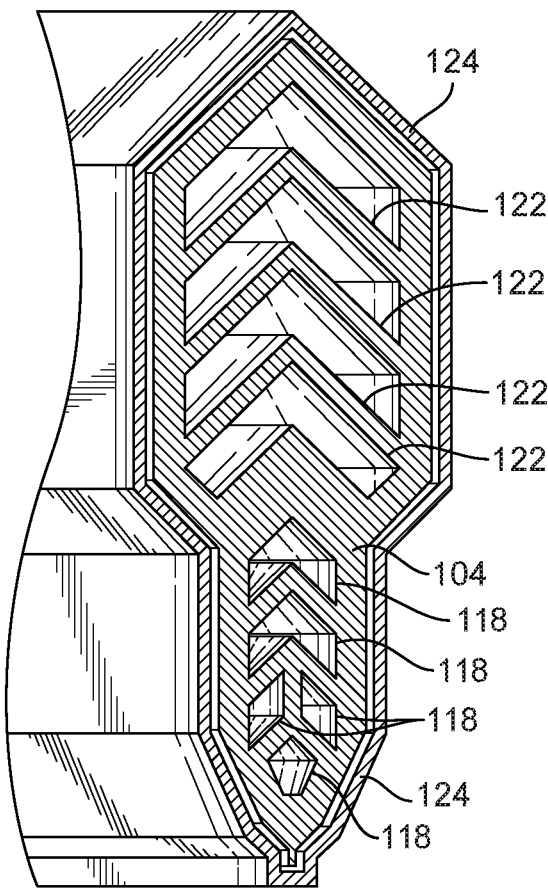
FIG. 6 is a cross-sectional view of a portion of the system of FIG. 1, showing the multiple flow channels in the main inlet and neighboring feed arm.

With reference to FIGS. 1 and 2, a main inlet 116 extends radially inward to the manifold ring 102 to supply fluid such as fuel to the manifold ring 102 from an outboard, external source. The manifold ring 102 defines a plurality of independent flow channels 118 extending circumferentially therein, as shown in FIG. 5. As shown in FIG. 4, the feed arms 104 can each define a plurality of independent flow channels 118 therethrough, in fluid communication with respective flow channels 120 of the manifold ring 102 which are shown in FIG. 5, for individual staging of multipoint injection from the nozzles 112. Each branch 110 and nozzle 112 (labeled in FIGS. 2-3) are in fluid communication with a respective flow channel 120 of their respective feed arm 104. As shown in FIG. 6, the main inlet 116 can also include a plurality of independent flow channels 122 therethrough in respective fluid communication with the flow channels 118 of the manifold ring 102, for independent control of the multipoint injection stages at the nozzles 112. A heat shield 124 extends about and shields all of the flow channels 118, 120, 122 by surrounding the manifold ring 102, the feed arms 104, and the main inlet 116. Portions of the heat shield 124 are shown in FIGS. 4, 5, and 6.

Figure 7:
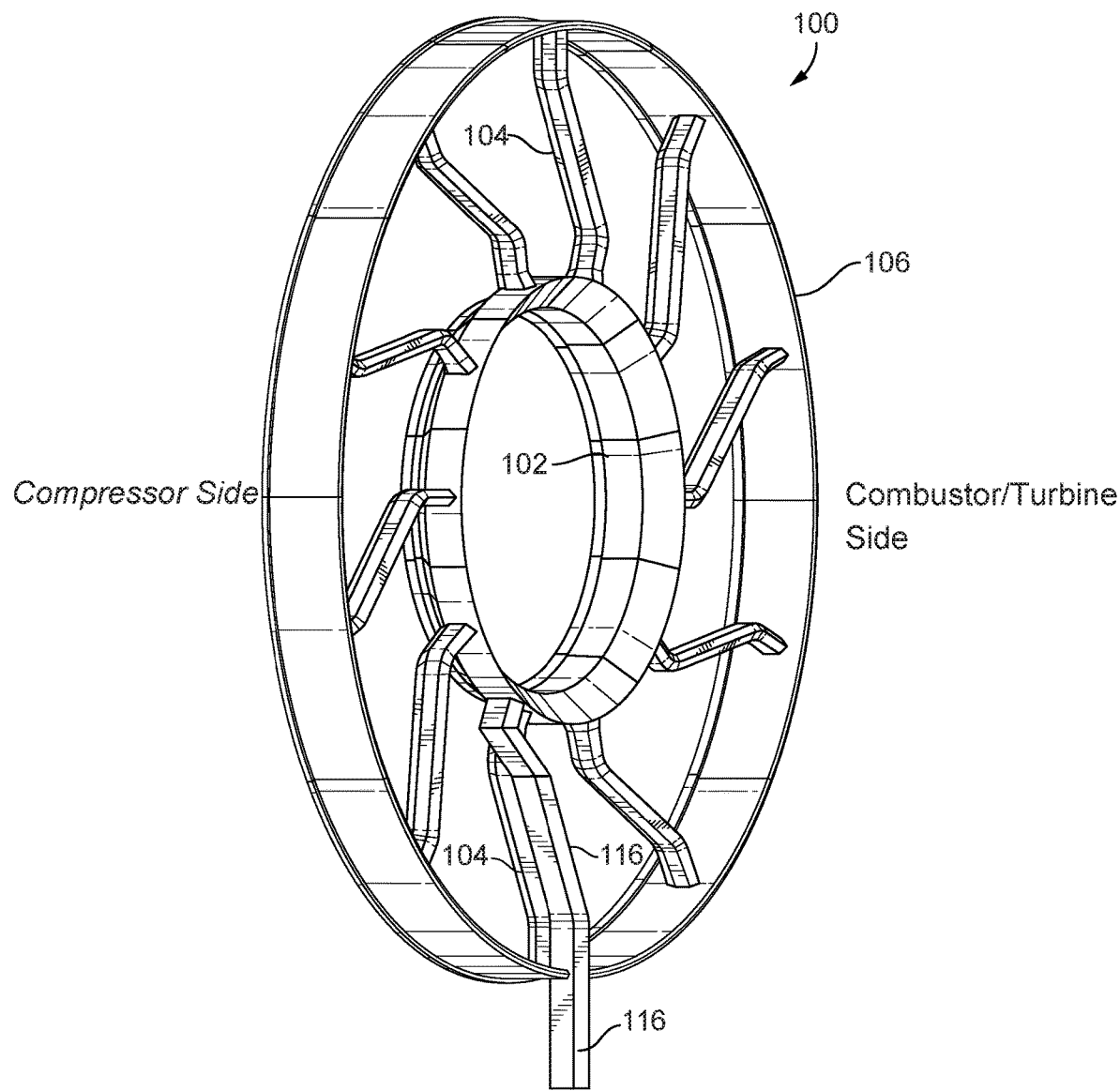
FIG. 7 is a perspective view of the system of FIG. 1, showing how the main inlet follows along one of the feed arms.

With reference now to FIG. 7, the main inlet 116 can extend along one of the feed arms 104 so that the main inlet 116 does not need to impose its own wake in the air flow through the system 100. The main inlet 116 extends along an upstream side (identified in FIG. 7 as the compressor side) of the respective feed arm 104, e.g., wherein the branches 110 described above extend to downstream facing nozzles 112 as shown in FIGS. 2-3 (the downstream direction is identified in FIG. 7 as the turbine side). As shown in FIG. 1, the main inlet 116 can branch from the one feed arm 104 in a Y-junction 126 proximate to the manifold ring 102 so the flow channels 122 of the main inlet 116 do not interfere with the flow channels 120 of the one feed arm 104 that the main inlet 116 follows.

Figure 8:
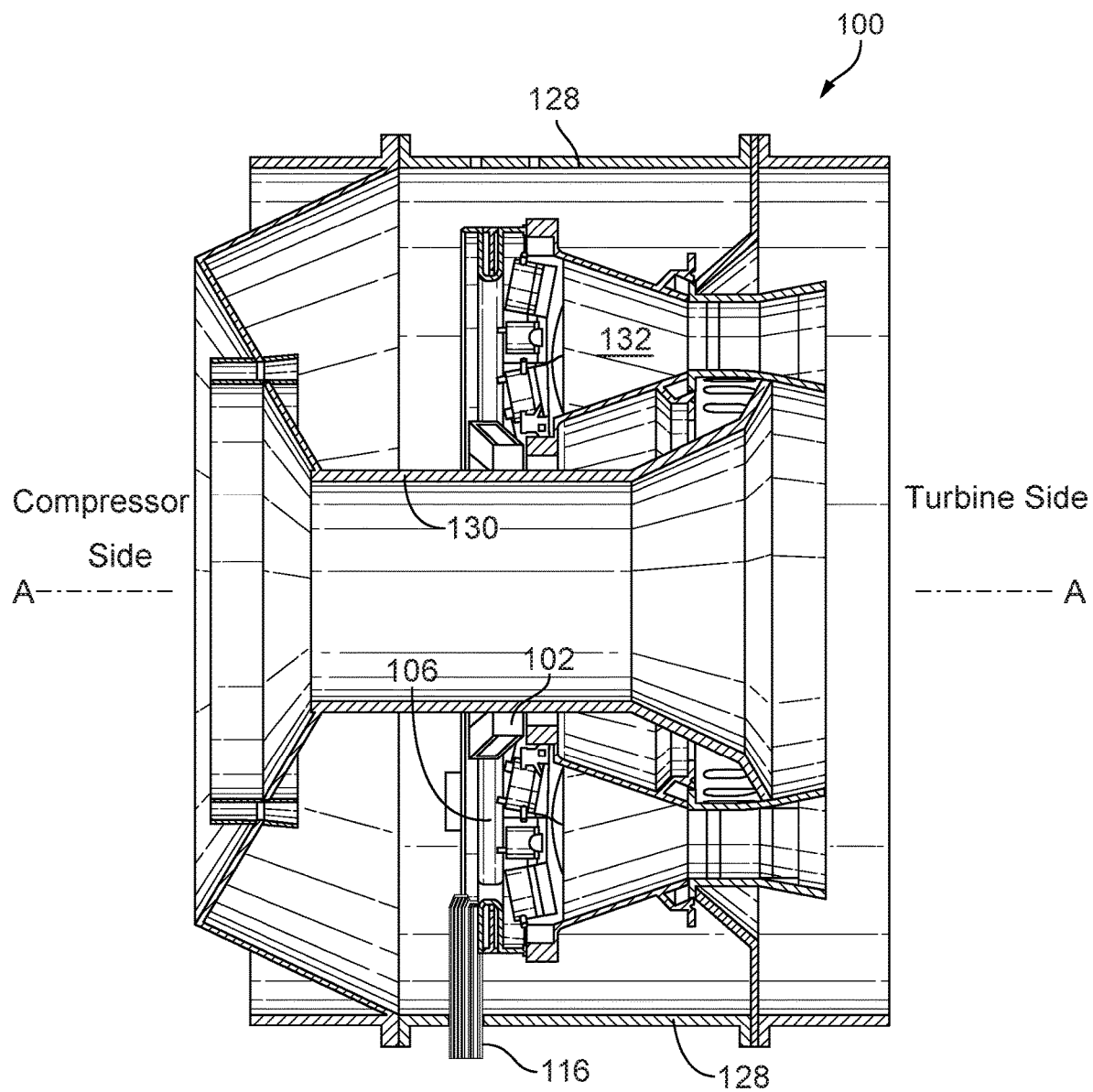
FIG. 8 is a cross-sectional side elevation view of the system of FIG. 1, showing the combustor and the inner and outer high pressure engine cases.

With reference again to FIG. 1, the main inlet 116 extends inward from a position outward of the outer ring 106. With reference to FIG. 8, an outer high pressure engine case 128 is radially outside the outer ring 106. The main inlet 116 extends inward through the outer high pressure engine case 128. The outer high pressure engine case 128 is devoid of any additional inlets extending therethrough to the manifold ring 102. In other words, the inlet 116 can be the one and only fuel inlet that has to pass through the high pressure engine case 128. An inner high pressure engine case 130 can be included radially inside the manifold ring 102. A combustor 132 is included, wherein the manifold ring 102 and feed arms 104 are integrated in a combustor dome (including the nozzles 112 and combustor dome wall 114 described above with reference to FIG. 3) at an upstream end of the combustor 132. The inner and outer high pressure engine cases 128, 130 define an annular geometry around the axis A. The combustor 132 and manifold ring 102 follow the annular geometry around the axis A.

Due to the fact that traditional manifold rings are positioned radially outside of the combustor or even outside of the high pressure engine case, the system 100 provides a much smaller diameter for the manifold ring 102 than in traditional systems. This reduced diameter represents the potential for considerably lower weight. The reduction in diameter also provides reduced manifold volume, meaning system 100 allows very fast fill time relative to the traditional systems. No elastomeric seals are required by system 100 as they are required in traditional systems, hence the system 100 offers considerably reduced risk of overboard leaks. While providing the reduce weight as explained above, system 100 nonetheless still accommodates numerous flow channels and injection sites. The fuel can thus be supplied to a ring manifold of a gas turbine engine radially inward of all nozzles of the gas turbine engine.

The methods and systems of the present disclosure, as described above and shown in the drawings, provide for manifolding with superior properties including multipoint injection with a reduction of engine weight, fast fill time, and reduced risk of overboard leaks. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A gas turbine engine comprising:
   a central, longitudinal axis defining a circumferential direction and a radial direction, the central, longitudinal axis defined by the gas turbine engine;
   a manifold ring defining at least one circumferentially extending flow channel;
   a plurality of feed arms extending radially outward from the manifold ring, wherein each feed arm includes a plurality of branches extending therefrom, wherein each branch is in fluid communication with the manifold ring through a respective one of the plurality of feed arms;
   a main inlet extending radially inward to the manifold ring, wherein the main inlet includes at least one main inlet fuel channel feeding radially inward to the at least one circumferentially extending flow channel of the manifold ring, and wherein each of the plurality of feed arms include at least one feed arm fuel channel feeding radially outward from the at least one circumferentially extending flow channel of the manifold ring; and
   a combustor wherein the manifold ring and the plurality of feed arms are integrated in a combustor dome at an upstream end of the combustor; and
   a plurality of nozzles, each nozzle connected to a respective one of the plurality of branches, wherein the gas turbine engine is devoid of nozzles radially inward from the manifold ring.

2. The gas turbine engine as recited in claim 1, further comprising a circumferentially segmented outer ring supported from the plurality of feed arms, radially outboard of the plurality of feed arms.

3. The gas turbine engine as recited in claim 1, wherein the at least one circumferentially extending flow channel of the manifold ring defines a plurality of independent flow channels extending circumferentially therein.

4. The gas turbine engine as recited in claim 3, wherein the at least one feed arm fuel channel of each of the plurality of feed arms define a plurality of independent flow channels therethrough, for individual staging of multipoint injection.

5. The gas turbine engine as recited in claim 1, wherein the main inlet extends along one of the plurality of feed arms.

6. The gas turbine engine as recited in claim 5, wherein the main inlet extends along an upstream side of the one of the plurality of feed arms.

7. The gas turbine engine as recited in claim 6, wherein the main inlet branches from the one of the plurality of feed arms in a y-junction proximate to the manifold ring.

8. The gas turbine engine as recited in claim 1, wherein the at least one main inlet fuel channel of the main inlet includes a plurality of independent flow channels.

9. The gas turbine engine as recited in claim 1, further comprising a circumferentially outer ring supported from the plurality of feed arms, radially outboard of the plurality of feed arms, wherein the main inlet extends radially inward from a position radially outward of the outer ring.

10. The gas turbine engine as recited in claim 9, further comprising an outer high pressure engine case radially outside the outer ring, wherein the main inlet extends radially inward through the outer high pressure engine case, and wherein the high pressure engine case is devoid of any additional inlets extending therethrough to the manifold ring.

11. The gas turbine engine as recited in claim 10, further comprising an inner high pressure engine case radially inside the manifold ring.

12. The gas turbine engine as recited in claim 1, further comprising a heat shield extending about and shielding the at least one circumferentially extending flow channel.

13. The gas turbine engine as recited in claim 1, wherein the gas turbine engine is free of elastomeric seals.

* * * * *